May 4, 1954

A. G. LUISADA

2,677,384

DEMOUNTABLE TENT CONSTRUCTION

Filed Aug. 22, 1952

INVENTOR.
AUGUST G. LUISADA
BY
Henry L. Shevier
ATTORNEY

May 4, 1954  A. G. LUISADA  2,677,384
DEMOUNTABLE TENT CONSTRUCTION
Filed Aug. 22, 1952  6 Sheets-Sheet 5

INVENTOR.
AUGUST G. LUISADA
BY Henry L. Shenier
ATTORNEY

Patented May 4, 1954

2,677,384

UNITED STATES PATENT OFFICE 2,677,384

DEMOUNTABLE TENT CONSTRUCTION

August G. Luisada, New York, N. Y., assignor to General Textile Mills, Inc., New York, N. Y., a corporation of Delaware Application August 22, 1952, Serial No. 305,769

9 Claims. (Cl. 135—3)

My invention relates to a demountable tent construction and more particularly to a tent having an unobstructed interior area which may be employed as a shelter for groups of men or for a hangar for aircraft.

A demountable tent which is adapted to be disassembled to occupy a comparatively small space so that it may be readily transported is of utility in military operations in areas where shelters are necessary, such as in the Arctic regions and the like.

Some of the demountable tents of the prior art require the use of poles fitted with guys and these are difficult to employ in terrains in which there are sandy soils. Soils of this type serve as poor anchors and stakes for the tent poles are apt to pull out under heavy loads occasioned by winds or snow or the like. Then, too, with the use of guy lines for the tent poles the shelters must be spaced far apart and traffic around the shelters is impeded.

One object of my invention is to provide a readily demountable tent construction in which the tent poles require no external guy lines.

Another object of my invention is to provide a readily demountable tent construction giving an unimpeded internal area in that no central pole is required.

Another object of my invention is to provide a readily demountable tent construction comprising essentially two diagonally arranged arches intersecting at an angle to each other centrally thereof.

A further object of my invention is to provide a readily demountable tent construction having a roof formed with a plurality of readily disassembled rigid members adapted to take a compression load and in which all other members, except the tent poles, are flexible tension members.

A further object of my invention is to provide a readily demountable novel tent construction.

A further object of my invention is to provide a readily demountable tent construction which may be quickly and easily assembled while on the ground and then pulled to erected position by means of a novel construction.

Other and further objects of my invention will appear from the following description.

In general my invention contemplates the provision of four sectional compression members which may be readily disassembled. Each of the compression members is adapted to be supported at one end thereof by a tent pole and is of a length approximately equal to half of the diagonal of the tent. Centrally of the tent the members are supported by catenaries extending across the tent diagonally from pole to pole. The compression members and the coacting tent poles, together with the bracing, form in essence two diagonally arranged arches intersecting centrally of the tent. The tent is guyed by diagonally arranged cross guys at the sides of the tent. Diagonally arranged guys extending from the juncture of the compression members to the top of the pole to the base of the pole are provided at all four poles in order to avoid the necessity of providing cross guys at the front and back of the tent. In this manner the tent may be employed for a hangar and a plane may be taxied into the tent and out through the tent, if desired, without changing its direction.

A feature of my invention is the ease with which my tent may be assembled. One of the prime difficulties of the demountable tents of the prior art is that after the framework is assembled it becomes necessary to place the canvas or other tent fabric over the framework. After the framework is erected this becomes a difficult task with large tents. In my construction the roof structure may be assembled and attached to the poles. The tent poles are formed with a joint adjacent their bases near the ground. The arrangement is such that the tent poles may lie flat upon the ground with the lateral guy wires in unsecured position. The tent covering may be placed over the roof and by traction the roof may be raised by pivoting all four tent poles to a vertical position determined by one of the guy wires. After the poles are in vertical position the other lateral guy wires may be secured in place and the tent is in erected position. The traction for erecting the tent may be provided by manpower or by an automotive vehicle.

In the accompanying drawings which form part of the instant specification and which are to be read in conjunction therewith and in which like numerals are used to indicate like parts in the various views.

Figures 1, 2, 3:
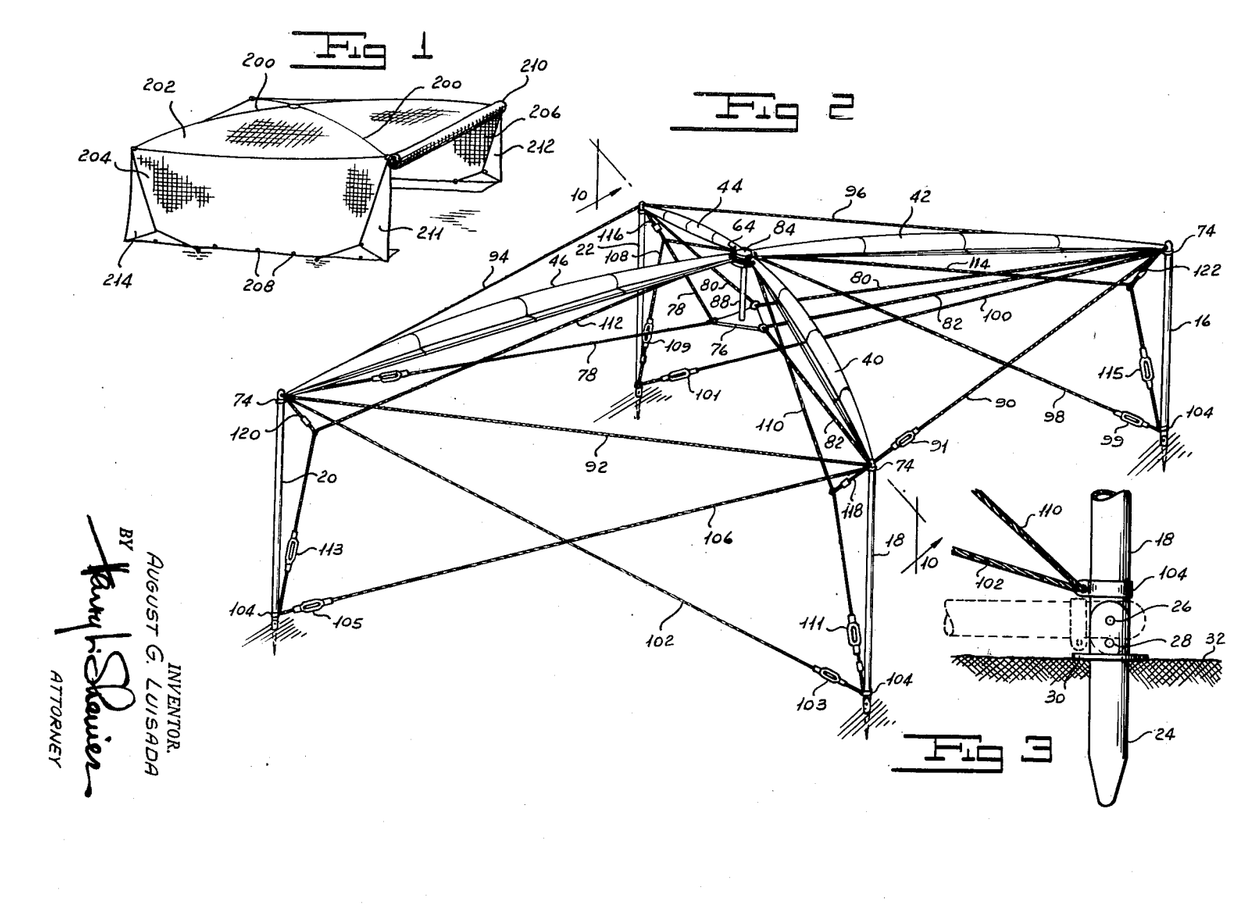
Figure 1 is a perspective view of a readily demountable tent with the tent covering in place showing one embodiment of my invention.
Figure 2 is a perspective view drawn on an enlarged scale showing the tent framework in erected position with the fabric removed.
Figure 3 is a fragmentary elevation showing the construction of the base of one of my tent poles.

More particularly, referring now to Figure 2 and considering the tent framework in erected position, I have shown four tent poles 16, 18, 20 and 22. These poles may be made of tubular metal such as aluminum or the like.

Referring now to Figure 3, it will be seen that the tent pole 18, for assembling, is formed with a lower portion 24 pivotally secured thereto by a pin 26. A locking pin 28 is adapted to secure the portion 24 rigidly to the main pole portion 18 when the tent is erected. The portion 24 is formed with a flange 30 adapted to limit the extent to which the pole is driven into the ground 32.

Figure 7:
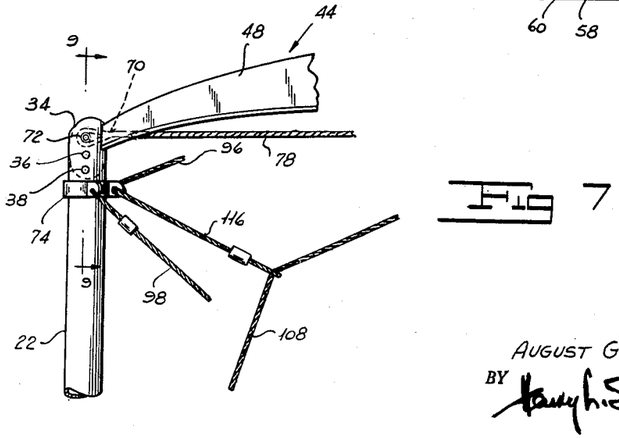
Figure 7 is a side elevation showing the details of assembly at the top of one of the tent poles.
Figure 9:
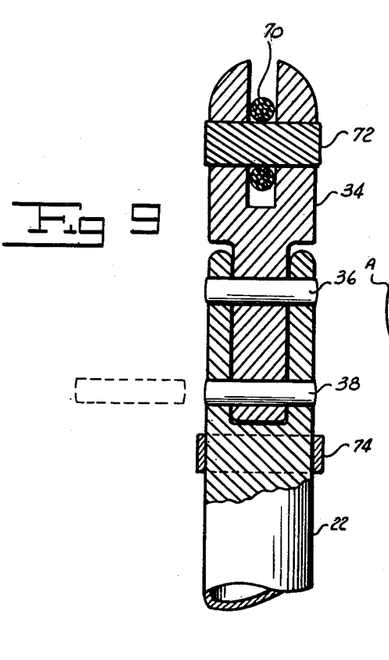
Figure 9 is a sectional view drawn on an enlarged scale viewed along the line 9—9 of Figure 7.

Referring now to Figures 7 and 9 in which the upper portion of a tent pole is shown in detail, it will be observed that the tent pole 22, for example, is formed with an upper portion 34 pivotally connected thereto by means of a pin 36. A locking pin 38 is adapted to secure the upper pivoted section 34 rigidly to the main pole portion 22. Each of the four poles is similarly provided with a lower stake portion and an upper pivoted portion.

In Figure 2, four compression members 40, 42, 44 and 46 are shown having one of their respective ends secured to the tent poles 18, 16, 22 and 20.

Figures 4, 5, 6:
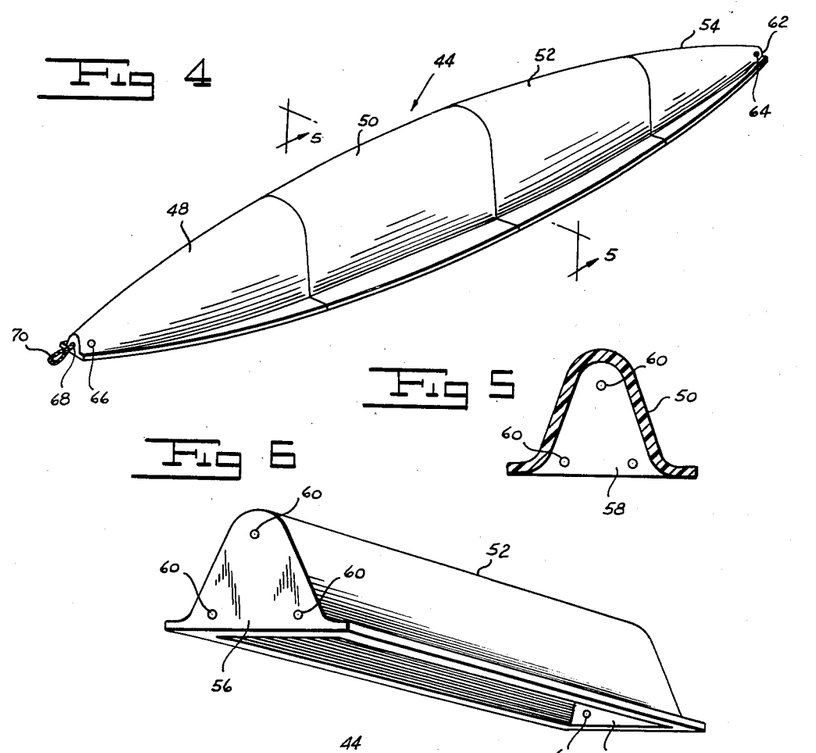
Figure 4 is a perspective view of an assembled compression member.
Figure 5 is a sectional view taken along the line 5—5 of Figure 4.
Figure 6 is a perspective view of one of the intermediate sections of my sectional compression member.

Referring now to Figure 4 in which I have shown a perspective view of one of the compression members, it will be noted that the compression member indicated generally by the reference numeral 44 is composed of four sections 48, 50, 52 and 54. The section 52 is shown in perspective in Figure 6. It comprises a hollow member made of any suitable material such as plastic, aluminum or the like having end walls 56 and 58. The end walls are provided with openings 60 which are adapted to register with like openings in adjacent sections. Bolts are then passed through the openings and the members secured to each other. It will be observed that this bolting can take place very readily through the open bottom portions of the hollow sections. For purposes of convenience I make section 50 longer than section 52 so that section 52 may be nested within section 50. Section 52 is in turn longer than section 48 so that section 48 may be nested within section 52. Section 48 in its turn is longer than section 54. In this manner, when a compression member is disassembled its sections may be nested within each other to occupy a minimum space during transportation. The section 54 is formed with an end 62 lying along the locus of the surface of a sphere. A pin 64 passes transversely through the end of section 54 adjacent the surface 62.

Referring to Figure 7, the end of each cable 78, 82, 82' and 80 is fitted with an eye. The end of cable 78 is formed with an eye 70. Each eye 70 is adapted to be secured to the upper end 34 of each pole by means of a pin 72 as can readily be seen by reference to Figures 7 and 9. It will be observed that this pin is of rather large diameter in order to prevent the cable from being cut. The upper portion of the pole carries a fitting 74 to which a plurality of cables or other suitable flexible members are adapted to be secured.

Figure 8:
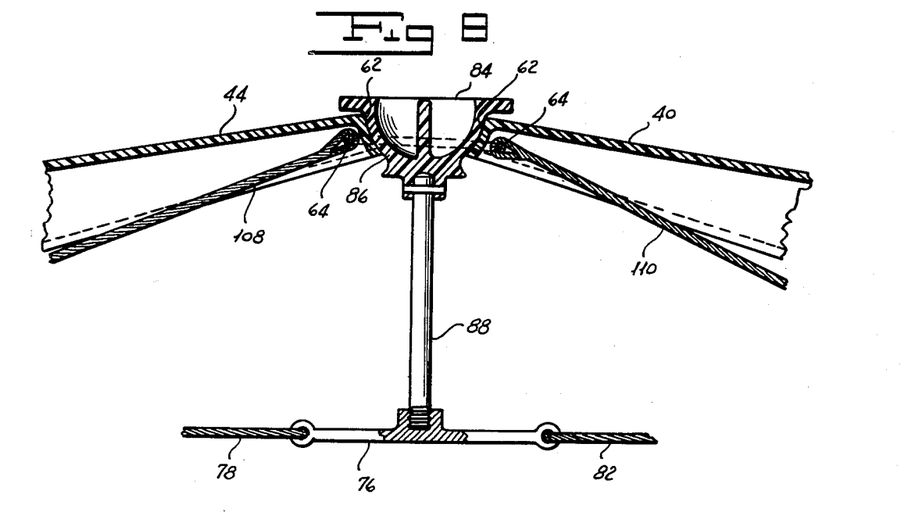
Figure 8 is a sectional view drawn on an enlarged scale showing the details of assembly at the central portion of my tent.
Figure 11:
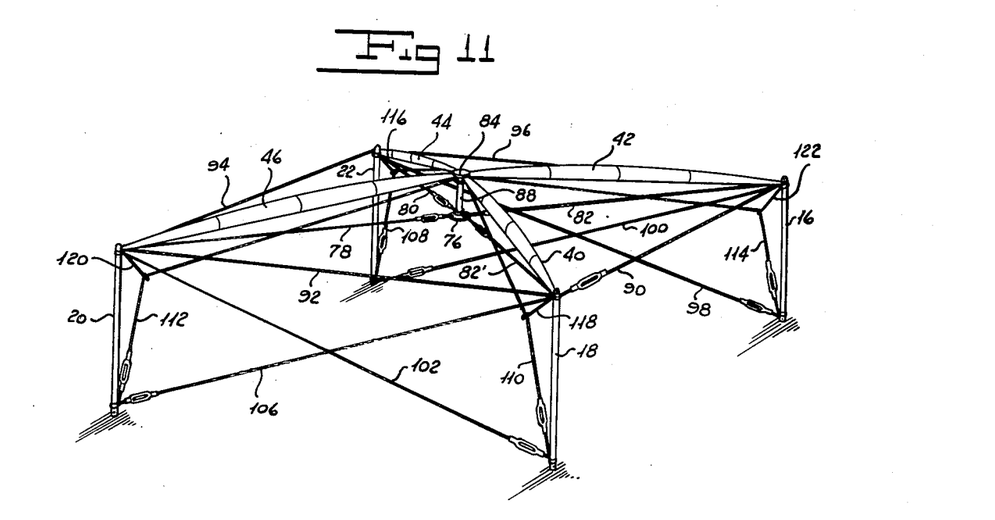
Figure 11 is a perspective view similar to Figure 2 drawn on a smaller scale showing another structure for supporting the compression members at the center of the tent.

Referring now to Figures 2 and 8, a triangular plate 76 is supported by three cables. One cable 78 extends from the fitting 74 on pole 20 to one corner of the plate 76 and thence to the pole 22. Another cable 80 extends from the pole 22 to another corner of the triangular plate 76 and thence to the fitting 74 on pole 16. Another cable 82 extends from the pole 16 to the third corner of the triangular plate 76 and thence to pole 18. The three cables 78, 80 and 82, together with triangular plate 76, form in effect a pair of crossed catenary members which support the plate 76. If desired, I may employ cables extending from the plate 76 to the poles along the diagonals of the tent, as can readily be seen by reference to Figure 11. In this form a single cable 78 extends from the pole 20 to the plate 76. A single cable 80 extends from the pole 22 to the plate 76. A single cable 82 extends from the plate 76 to the pole 16, and a fourth cable 82' extends from the plate 76 to the pole 18.

Referring again to Figures 2 and 8, an upper bearing member 84, which can best be seen in Figure 8, is formed with a spherical surface 86.

The ends of the compression members seat against this spherical surface. The bearing member 84 is supported by the plate 76 through a rod 88. A horizontal, flexible tie member 90 extends between fittings 74 carried by poles 18 and 16. Similarly, a horizontal cable 92 extends between poles 18 and 20; a horizontal cable 94 extends between poles 20 and 22; and a horizontal cable 96 extends betweens poles 16 and 22. These horizontal cables are adapted to support the tent covering, as can readily be seen by reference to Figure 1.

Referring again to Figure 2, a diagonally arranged guy 98 extends from the top of pole 22 to adjacent the bottom of pole 16. A second diagonally arranged guy 100 extends from the top of pole 16 to adjacent the bottom of pole 22. Similarly, a diagonally arranged guy 102 extends from the top of pole 20 to adjacent the bottom of pole 18. Each of the poles is provided with a fitting 104 similar to the fitting 74 to which the various flexible members may readily be secured, as can be seen by reference to Figure 3. Similarly, another diagonally arranged guy 106 extends from the top of pole 18 to adjacent the bottom of pole 20. The diagonally arranged guys 98, 100, 102 and 106 may be fitted with turnbuckles 99, 101, 103 and 105 respectively to adjust the respective tensions in these guy members so that they all will be equal when the poles 16, 18, 20 and 22 are vertical.

The horizontal tie members 90, 92, 94 and 96 may be formed of a single cable, if desired, fitted with a turnbuckle 91.

Figure 10:
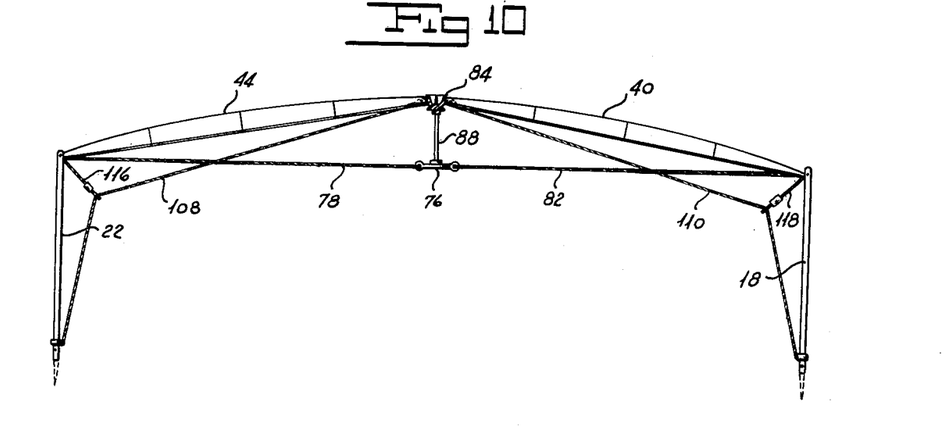
Figure 10 is a sectional view taken along the line 10—10 of Figure 2.
Figure 12:
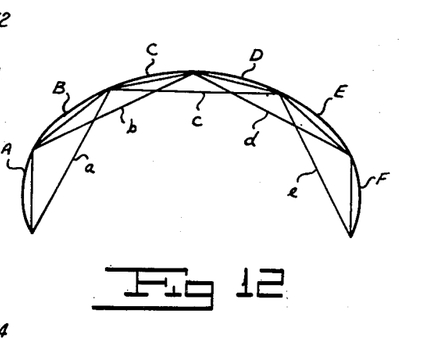
Figure 12 is a diagrammatic view similar to Figure 10 showing another embodiment of the diagonally arranged arch of my invention adapted to be used for tents of larger size.

It will be observed that each of the end sections 54 is formed with the spherical surface 62 adapted to coact with the spherical surface 66 of the member 84. A ring-shaped member 64 connects members 40, 42, 46 and 48. Around the member 64, I secure one end of a cable 108 the other end of which is secured adjacent the bottom of pole 22 to the fitting 104. Around the member 64, I secure one end of a cable 110 the other end of which is secured adjacent the bottom of pole 18. Similarly, to the member 64, I secure one end of a cable 112 the other end of which is secured adjacent the bottom of pole 20. In the same manner, to the member 64, I secure one end of cable 114 the other end of which is secured adjacent the bottom of pole 16. Each of the inclined guy members 108, 110, 112 and 114 is provided with a respective turnbuckle 109, 111, 113 and 115. From the top of pole 22 to a point intermediate the inclined guy member 108 I provide a breast tension member 116. Similarly, from the top of pole 18 to a point intermediate the inclined guy 110 I provide a breast tension member 118. Likewise, a breast tension member 120 extends from the top of pole 20 to a point intermediate the flexible member 112, and a breast tension member 122 extends from the top of pole 16 to a point intermediate the flexible member 114. The breast tension members 116, 118, 120 and 122 serve to hold the chord tension members 108, 110, 112 and 114 upwardly and outwardly to afford a clear space within the shelter. This can be seen readily by reference to Figure 10. From this figure it will be noted that the pole 22, the member 44, the member 40 and the pole 18 are all compression members. The opposite ends of any two adjacent compression members are connected by a flexible chord member. For example, the lower end of pole 22 and the upper end of member 44 are connected by the member 108. The lower end of member 44 and the lower end of member 40 are connected by a chord member comprised of the members 78 and 82. The upper end of member 40 and the lower end of pole 18 are connected by a chord member 110. The breast members 116 and 118 do not affect this connection. Together, as can be seen by reference to Figure 10, the poles 22 and 18 and the members 44 and 40, together with their chord members, form an arch extending diagonally across the shelter. In a similar manner the pole 20, the member 46, the member 42 and the pole 16, together with the chord members, form a second arch which is disposed across the opposite diagonal of the shelter intersecting the first arch. The principle of the construction is illustrated in the diagram of Figure 12 to which reference is now had. The series of compression members A, B, C, D, E and F is formed by joining one compression member to the adjacent member. Members A and F have contact with the ground and may be considered as the poles. The ends of members A and B are connected by a flexible member $a$. The ends of members B and C are connected by a flexible member $b$. The ends of members C and D are connected by a flexible member $c$. The ends of members D and E are connected by a flexible member $d$ and the ends of members E and F are connected by a flexible member $e$. It will be seen that the construction results in a rigid arch. Members A and B cannot form an angle more acute to each other for to do so would involve the stretching of flexible member $b$. Members A and B cannot form an angle more obtuse to each other for to do so would involve the stretching of flexible member $a$. It is understood, of course, that the lower ends of members A and F are anchored in the ground. Members B and C cannot form an angle more acute to each other for to do so would involve the stretching of both flexible members $a$ and $c$. Members B and C cannot form an angle more obtuse to each other for to do so would involve the stretching of flexible member $b$. It will be seen that all of the compression members are maintained in their correct position by the flexible members. We have in essence an arch formed of a plurality of compression members joined to each other at their free ends, the outermost of each of the compression members being anchored and extending substantially vertically from the ground or other suitable support. The ends of each two joined compression members are bridged by a flexible chord member, thus forming the arch structure. Two arches are disposed at an angle to each other intersecting intermediate the ends of the entire arch. The intersecting arches form the framework for the tent.

In use, when it is desired to erect the tent, the sections of the compression members are joined so that each of the compression members is assembled, as shown in Figure 4. The stake ends of each of the poles are driven into the ground at an appropriate site at the four corners of the rectangle or square to be formed by the tent. In this operation the pins 28 are removed so that the main portion of the tent poles will lie horizontally. The poles on one side are in alignment with each other and the poles on opposite sides are parallel. The tops of the poles are extending in one direction.

Referring to Figure 2, let us assume that all of the poles are oriented so that the tops extend to the left as viewed in this figure. The lower ends of the compression members are secured to the tops of the poles by means of their loops 70 and the pins 72. The plate 76 is placed on the ground centrally of the tent and the flexible members 78, 80 and 82 are secured as shown in Figure 2 through the plate 76 with the ends secured to the respective poles. The member 84 is then placed in position and the central ends of the compression members placed upon the spherical surface, it being understood that the horizontal tie members 90, 92, 94 and 96 have also been put in place. These horizontal tie members prevent the pole ends of the compression members from moving outwardly so that the spherical ends of the compression members will rest against the spherical bearing member 84. Temporary cross guy members are then rigged across the front and back portions of the tent similar to guy members 102 and 106. These guy members are used only in the erection of the tent and form no part of the finished tent. Guy members 100 and 106 are then secured in place. Guy members 98 and 102 are secured at their upper ends to poles 22 and 20 respectively. The upper ends of chord members 108, 110, 112 and 114 are secured to the respective pins 64 and lead through breast members 116, 118, 120 and 122, respectively. The lower ends of these chord members are not secured at this time. The tent fabric is then draped over the structure on the ground. Lines are then made fast to the upper ends of poles 16 and 18. These lines are then hauled by manpower or by automotive traction permitting all four poles to pivot about their lower pivot pins 26 raising the roof structure formed by the compression members, the crossed catenaries and the horizontal tie cables. During this motion the roof structure moves in a position parallel to the ground. When the poles are vertical as determined by guys 100 and 106 being fully extended, guys 98 and 102 are then secured by means of their respective turnbuckles 99 and 103. Chord members 108, 110, 112 and 114 are secured to the lower ends of respective poles through their respective turnbuckles 109, 111, 113 and 115. The temporary cross guys at the front and back of the tent which may be made of rope or the like are then removed. The side curtains 204 and 206 are then staked to the ground by stakes 208. The front curtain may be rolled into a roll 210. The back curtain may be similarly rolled if desired. Wind flaps 211 and 212 are secured clear of the front entrance. Similar wind flaps 214 are provided for the rear of the tent. It is understood, of course, that any suitable fabric may be employed of any suitable design. When the tent is erected the intersecting diagonally arranged arches form a strong support for the tent covering and are adapted to withstand wind loads and snow loads while giving a free and uninterrupted area within the shelter.

Figure 18:
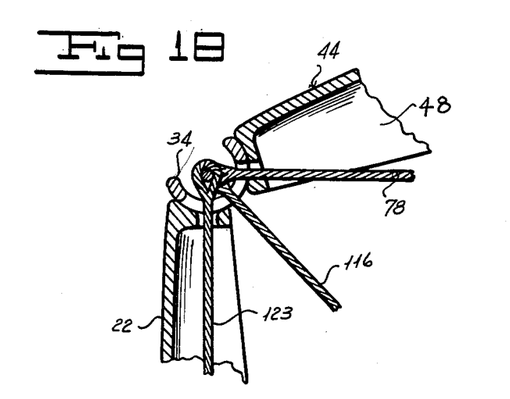
Figure 18 is a fragmentary sectional view drawn on an enlarged scale similar to Figure 7, showing a modified construction for the details of assembly at the top of one of my tent poles.
Figure 19:
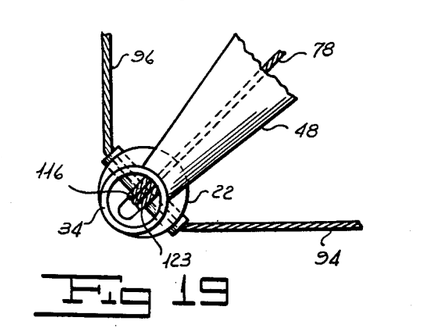
Figure 19 is a fragmentary plan view of the structure shown in Figure 18.

Referring now to Figure 18, it will be observed that in this embodiment of my invention the upper end of member 22 and the lower end of member 48 are provided with a spherical surfaces. A bearing member 34 is held seated upon the spherical surface of the upper end of member 22 by the tension cable 123. The tension member 78 positions the end of member 44 against the spherical surface of the member 34. The joint, therefore, between members 44 and 22 is essentially a universal joint within a limited degree of movement.

Figure 20:
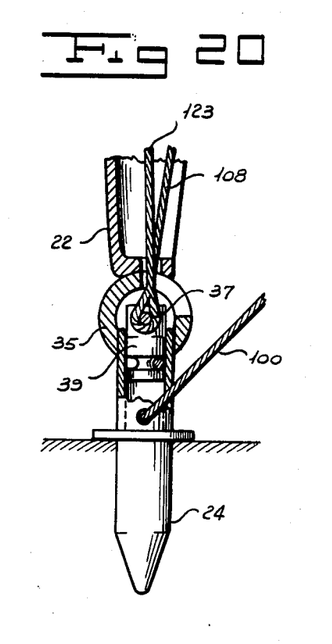
Figure 20 is a fragmentary sectional view similar to Figure 3, showing a modified construction at the base of one of my tent poles.

Substantially the same arrangement is shown in Figure 20, in which a member 35 provides a spherical bearing surface for the lower end of member 22. Member 22 is positioned by the flexible tensioning member 123, which is secured around a pin 37 carried by the ground engaging member 24 through a rotatable member 39. The member 35 is carried by the ground stake 24.

Figure 21:
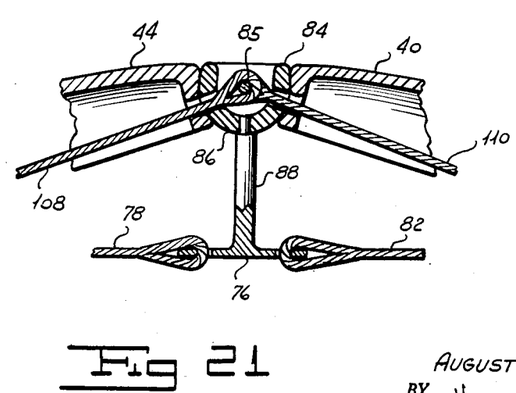
Figure 21 is a sectional view drawn on an enlarged scale similar to Figure 8, showing a modified form of the details of assembly at the central portion of my tent.

Figure 21 shows a modification in which the flexible members 108 and 110 extend through the upper member 84 and are secured to a pin 85 carried thereby. This construction positively positions the upper ends of members 44 and 40 upon the spherical surface 86 of the member 84.

Figure 13:
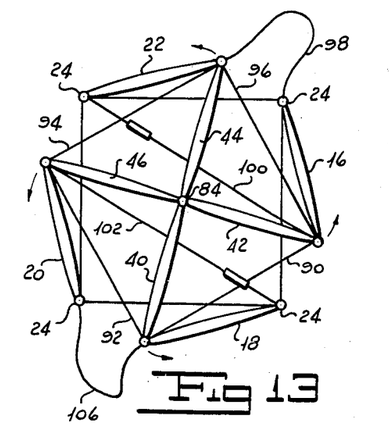
Figure 13 is a top plan view of another embodiment of my invention resting on the ground, ready to be erected by counterclockwise rotation of the pole members.
Figure 14:
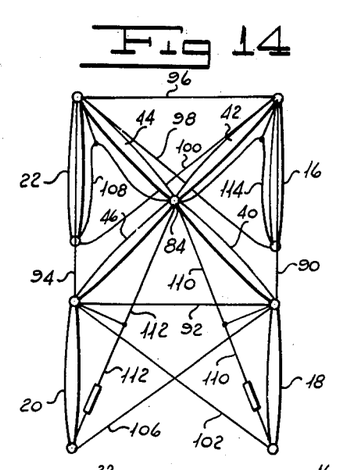
Figure 14 is a perspective view of the tent framework shown in Figure 13 in erected position.

Referring now to Figure 13, it will be noted that the tent framework is lying on the ground and that the upper and lower joints of the tent poles are of the form shown in Figures 18 and 20 by which universal joints are provided. The flexible members 90, 92, 94 and 96 have been positioned. The diagonally arranged guy 100 extending from the bottom of pole 22 to the top of pole 16 is in position. Both guys 100 and 102 are taut. Diagonally arranged guys 98 and 106 are in position, but slack. The inclined guys 108, 110, 112 and 114 are not in position. With the parts as shown in Figure 13, the roof structure is rotated in a counterclockwise direction, as shown by the arrows, until the poles are vertical. At this time the inclined guys 108, 110, 112 and 114 are then placed in position and will serve to maintain the structure erect. It is to be understood, of course, as pointed out above, that the tent fabric may be placed on the framework on the ground so that when the rotation just described is completed the tent will be in erected position. If an arch composed of multiple members such as shown in Figure 12 is employed, as is necessary for larger tents, additional horizontal tie members will be needed.

Figure 15:
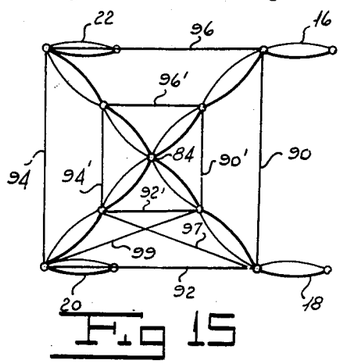
Figure 15 is a top plan view of another embodiment of my invention showing a pair of intersecting arches, such as shown in Figure 12, on the ground, ready to be erected by the rotation of the pole members through a pair of parallel vertical planes.

Referring now to Figure 15, the tie member 96' parallels the tie member 96. The tie member 94' parallels the horizontal tie member 94. The tie member 92' parallels the horizontal tie member 92, and the horizontal tie member 90' parallels the horizontal tie member 90. A pair of diagonally arranged tie members 99 and 97 may be provided for increased stability. It is to be understood that if desired, the horizontal tie members may be incorporated in the tent fabric. In most cases, however, it is preferable to use separate horizontal tie members. The structure in Figure 15 can be erected as described above by pulling the upper ends of tent poles 16 and 18 to the right as viewed in Figure 15. Both tent poles 16 and 22 will rotate in a vertical plane and tent poles 18 and 20 rotate in a second vertical plane parallel to the first vertical plane. When the tent poles are vertical, the permanent cross guys and inclined guys are secured, it being understood, of course, that temporary cross guys will be employed, as pointed out above, during the erecting operation.

Figure 16:
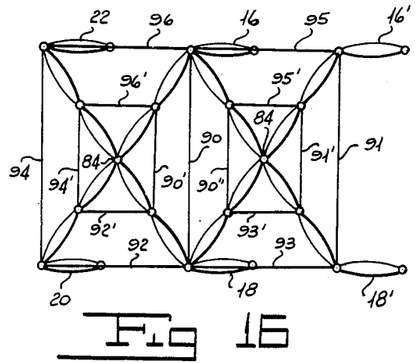
Figure 16 is a modified tent structure showing a pair of bays each formed similar to the construction shown in Figure 15, on the ground, ready to be erected.
Figure 17:
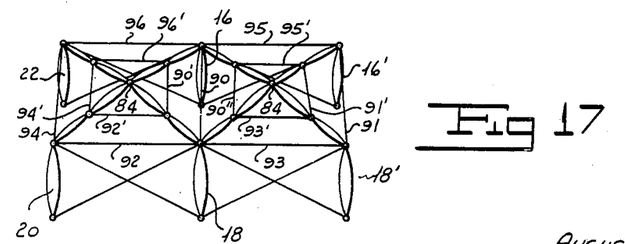
Figure 17 is a perspective view showing the structure in Figure 16 in erected position.

If a really large shelter is required, two pairs of intersecting arches may be assembled as shown in Figure 16. In this case, the tent poles 16 and 18 form a common member for one end of each of two arches. The erected framework of Figure 16 is shown in Figure 17.

It will be seen that I have accomplished the objects of my invention. I have provided a readily demountable tent construction in which the tent poles require no external guy lines and which has an unimpeded internal area, requiring no central pole. I have provided a readily demountable guyless tent which comprises a framework consisting essentially of two diagonally arranged arches intersecting at an angle to each other centrally thereof. My readily demountable tent construction has a roof formed with a plurality of readily disassembled rigid members. These rigid members, together with the tent poles, are the only compression members in my construction. My readily demountable tent may be assembled while on the ground and conveniently pulled to erect position with the tent covering therefore placed over the framework.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A readily demountable tent including a pair of diagonally intersecting arches, each arch comprising a plurality of compression members abutting each other along the locus of the arch, a plurality of flexible chord members respectively extending from the end of one compression member to the opposite end of an adjacent compression member, the terminal compression members of the arch being substantially vertical and acting as tent poles, and tent fabric positioned over the intersecting arches.

2. A readily demountable tent comprising two diagonally arranged arches intersecting each other substantially centrally thereof, each of the arches including four compression members one pair of which extends adjacent the roof and the other pair of which extends substantially vertically from the roof to the ground, a substantially horizontal flexible chord member joining the outboard ends of the roof compression members, a downwardly directed flexible chord member extending from between the roof compression members to adjacent the bottom of one of the vertical compression members, a downwardly directed flexible chord member extending from between the roof compression members to adjacent the bottom of the other vertical compression member of an arch, a substantially horizontal flexible member extending between the ends of each adjacent pair of the roof compression members, a diagonally arranged tension member extending from adjacent the bottom of a first one of said substantially vertical compression members to the top of a second vertical compression member, a second tension member extending from the top of the first vertical compression member to adjacent the bottom of the second substantially vertical compression member, a third diagonally arranged compression member extending from the top of a third vertical compression member to adjacent the bottom of a fourth vertical compression member, a diagonally arranged tension member extending from the top of the fourth vertical compression member to adjacent the bottom of the third vertical compression member, and a tent fabric positioned over the framework of the diagonally intersecting arches.

3. A readily demountable tent as in claim 2 in which each of the roof compression members comprises a plurality of sections each formed with flanges adapted to abut, and means for securing the flanges to each other.

4. A readily demountable tent as in claim 2 in which each of the roof compression members comprises a plurality of hollow members, means for securing the members to each other, said members being of progressively smaller length whereby when disassembled the hollow members may be nested one within the other.

5. A readily demountable tent as in claim 2 including a centrally positioned plate supported by the substantially horizontal flexible chord members and a strut extending from the plate to the juncture of the roof compression members.

6. A readily demountable tent as in claim 2 including a centrally positioned plate supported by the substantially horizontal flexible chord members and a strut extending from the plate to the juncture of the roof compression members, a bearing member carried by the upper portion of the strut, the roof compression members abutting the bearing member.

7. A readily demountable tent as in claim 2 in which each of the substantially vertical compression members is a tent pole, each tent pole being formed with a hinge adjacent its bottom, and means for immobilizing each hinge.

8. A readily demountable tent as in claim 2 in which each of said substantially vertical compression members comprises a tent pole, a hinge formed adjacent the upper portion of each tent pole, and means for immobilizing the hinge.

9. A readily demountable tent as in claim 2 in which a breast line extends from the top of each vertical compression member to the downwardly directed flexible chord member, each of said breast lines being shorter than the rise of the chord.

References Cited in the file of this patent

UNITED STATES PATENTS

| Number | Name | Date |
|---|---|---|
| 1,958,296 | Crow | May 8, 1934 |

FOREIGN PATENTS

| Number | Country | Date |
|---|---|---|
| 3,113 | Great Britain | of 1871 |
| 204,537 | Great Britain | Oct. 4, 1923 |